US007010496B2

(12) United States Patent
Wong

(10) Patent No.: US 7,010,496 B2
(45) Date of Patent: Mar. 7, 2006

(54) SUPPLIER PERFORMANCE REPORTING

(75) Inventor: Alvin Wong, Monterey Park, CA (US)

(73) Assignee: Accenture Global Services GmbH, Neuhausen am Rheinfall (CH)

( * ) Notice: Subject to any disclaimer, the term of this patent is extended or adjusted under 35 U.S.C. 154(b) by 335 days.

(21) Appl. No.: 10/071,802

(22) Filed: Feb. 6, 2002

(65) Prior Publication Data

US 2003/0149611 A1    Aug. 7, 2003

(51) Int. Cl.
*G06F 17/60* (2006.01)
(52) U.S. Cl. .................................. 705/10; 705/7; 705/8
(58) Field of Classification Search .................. 705/7, 705/11, 10
See application file for complete search history.

(56) References Cited

U.S. PATENT DOCUMENTS

| 4,887,208 A | * | 12/1989 | Schneider et al. ............ 705/28 |
| 5,627,973 A | * | 5/1997 | Armstrong et al. ........... 705/10 |
| 5,765,138 A | * | 6/1998 | Aycock et al. ................. 705/7 |
| 5,809,479 A | * | 9/1998 | Martin et al. ................. 705/11 |
| 5,960,408 A | * | 9/1999 | Martin et al. ................. 705/11 |
| 6,029,140 A | * | 2/2000 | Martin et al. ................. 705/11 |
| 6,292,784 B1 | * | 9/2001 | Martin et al. ................. 705/11 |
| 6,317,415 B1 | * | 11/2001 | Darnell et al. ............... 370/230 |
| 6,499,657 B1 | * | 12/2002 | van Abeelen et al. ...... 235/375 |
| 6,530,518 B1 | * | 3/2003 | Krichilsky et al. .......... 235/375 |
| 6,539,386 B1 | * | 3/2003 | Athavale et al. ............. 707/10 |
| 6,654,726 B1 | * | 11/2003 | Hanzek ......................... 705/26 |

OTHER PUBLICATIONS

Rossler, Paul E; Hirsz, A B. Purchasing's interaction with customers: The effects on customer satisfaction—a case study. International Journal of Purchasing and Materials Management. v21n1 p 37-43. Winter 1996. from Dialog.*
"SeeChain Supplier-Managing the First Link in the Supply Chain", A White Paper by SeeCommerce, Jan. 28, 2000, 6 pgs.
"Enhancing Supply Chain Velocity at DaimlerChrisler", A White Paper by SeeCommerce, Jul. 17, 2001, 16 pgs.

* cited by examiner

*Primary Examiner*—Tariq Hafiz
*Assistant Examiner*—Johnna Stimpak
(74) *Attorney, Agent, or Firm*—Banner & Witcoff, Ltd.

(57) ABSTRACT

A system and method is provided for improved reporting of supplier performance. A system receives and processes data to enable reporting of on-time performance relative to a plurality of order start points and a plurality of order end points. Buyers and suppliers report on-time performance for system processing using the delivery start points and end points collected in the normal course of their business operations. System users may obtain supplier on-time performance reports indicating the on-time performance of suppliers relative to the plurality of start point/end point pairs reflected in the collected data. A system and method is also provided for improved reporting of reject performance. A system stores collected information predictive of whether an order reject was supplier caused or buyer caused. The predicted cause of order rejects is reflected in supplier reject performance as reported to system users.

10 Claims, 7 Drawing Sheets

20 Basic Purchase Order Data:

| Record No. | Supplier Name | Start Point | End Point | Purchase Order No. | Line Item Number | Order Due Date | Invoice amount | Received date | Paid amount | Order Status | Customer Part Number | Manufacturer Part Number | Quantity | SIC code | Buyer Name |
|---|---|---|---|---|---|---|---|---|---|---|---|---|---|---|---|
| 1 | Jane Doe Co. | OC | CFD | X025A-1 | 1 | 10/1/01 | $60,000.00 | 10/1/01 | 60,000.00 | Closed | F-2101 | 123-4567 | 5000 | 3324 | GoodCo Inc. |
| 2 | Jane Doe Co. | OC | CFD | X025A-1 | 2 | 10/1/01 | $5,498.26 | 10/05/01 | 5000.00 | Closed | SDD-3 | 100-3456 | 50 | 3311 | GoodCo Inc. |
| 3 | Jane Doe Co. | OC | CFD | B89T | 1 | 10/7/01 | $20.05 | 10/06/01 | 20.00 | Closed | AA-02 | 789 | 2 | 2432 | GoodCo Inc. |
| 4 | Jane Doe Co. | OS | SSD | B91T | 1 | 9/28/01 | 1400.02 | 9/28/01 | 1,400.00 | Closed | AA-03 | 1234A | 800 | 5643 | GoodCo Inc. |
| 5 | Max Doe Co. | OS | CRD | 11893267 | 1 | 10/12/01 | 1,110.00 | 10/14/01 | 1,110.00 | Closed | B123 | 1234A | 800 | 5643 | GoodCo Inc. |

FIG. 2a

25 Summarized Purchase Order Data (summarized by Supplier for each Buyer):

| Record No. | Supplier Name | Start Point | End Point | # of POs | # of Line Items | Orders On Time | Line Items On Time | Buyer Name |
|---|---|---|---|---|---|---|---|---|
| 1 | Jane Doe Co. | OC | CFD | 2 | 3 | 1 | 2 | GoodCo Inc. |
| 2 | Jane Doe Co. | OC | SSD | 1 | 1 | 1 | 1 | GoodCo Inc. |
| 3 | Max Doe Co. | OC | CRD | 1 | 1 | 0 | 0 | GoodCo Inc. |

FIG. 2b

Supplier S1

All customer orders

| Start point / End point | No. of orders | % on time | No. line items | % on time |
|---|---|---|---|---|
| OS-CFD | 45 | 13% | 200 | 42% |
| OC-SRD | 89 | 95% | 305 | 97% |
| OC-DTO | 894 | 85% | 1,845 | 96% |
| OC-CFD | 499 | 46% | 2,014 | 67% |

Customer C1 orders

| Start point / End point | No. of orders | % on time | No. line items | % on time |
|---|---|---|---|---|
| OS-CFD | 4 | 12% | 17 | 36% |
| OC-SRD | 0 | --% | 0 | --% |
| OC-DTO | 0 | --% | 0 | --% |
| OC-CFD | 223 | 41% | 865 | 62% |

FIG. 4

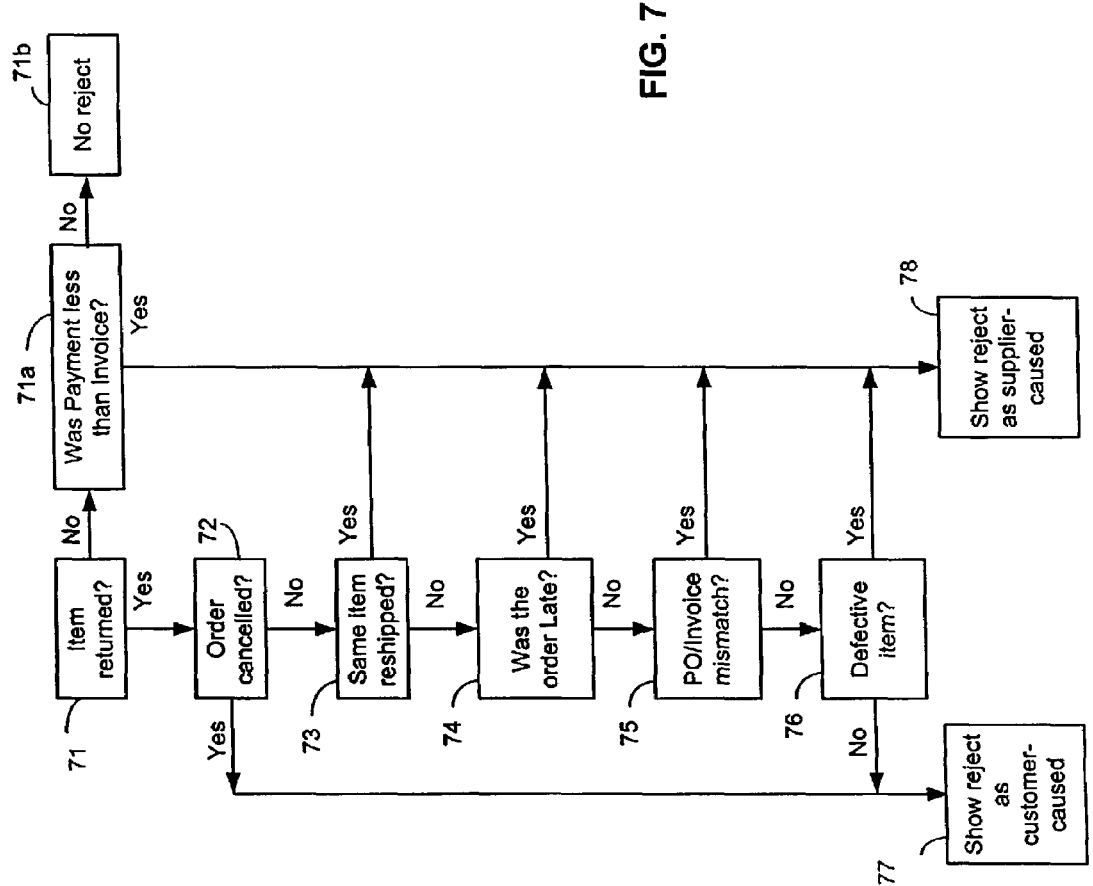

SUPPLIER PERFORMANCE REPORTING

BACKGROUND OF THE INVENTION

This invention relates to a system and method for reporting supplier on-time performance and a system and method for reporting supplier reject performance.

Supplier on-time performance is typically reported as a percentage of orders that are delivered within a specified period of time with respect to a standardized start point and end point. In order to measure the amount of time that a supplier takes to deliver product in response to an order, a "start point," i.e. an event triggering the start of a time period used to measure delivery time, must be identified. An "end point," i.e., an event triggering the end of the time period used to measure delivery time, must also be identified. Typically, the possible start points used for measuring delivery time include: the time at which the buyer placed the order ("order sent" or "OS"), the time at which the supplier received the order ("order received" or "OR"), and the time at which the supplier confirmed the order with the buyer ("order confirmed" or "OC"). Possible end points that might be used for measuring delivery time are, for example, the arrival time of the supplier shipment at one of the following: the customer's receiving dock ("CRD") (note, the terms "customer" and "buyer" are used interchangeably herein); the customer's final destination ("CFD", e.g. customer storeroom, customer assembly line, customer mail stop); the origin transport on board ("OTO", i.e., loaded onto the shipping vehicle at the origin); destination transport onboard ("DTO", i.e. when the shipping vehicle arrives at its destination country); destination customs inbound ("DCI", i.e. arrival at customs in the destination country prior to customs processing); destination customs outbound ("DCO", i.e., point at which customs processing in the destination country is completed); or the supplier shipping dock ("SSD").

Existing supplier performance reporting systems generally pick a single start point and a single end point to use as the standardized start and end points for determining the time period against which to measure whether or not a delivery is "on time." Such systems require users to report on time performance using a standardized start and end point. This approach has at least two disadvantages. First, the customers that are providing on-time delivery data for use by such systems may not ordinarily track delivery times using the standardized start point and end point required by the system. Thus, customers may have to adjust existing internal procedures in order to report delivery time data that is useable by such systems. A second disadvantage of such systems is that customers whose businesses place an importance on delivery times using start and end points different from those used by the reporting system will not be able to gauge the performance of suppliers in a manner that is consistent with the particular business needs of such customers.

Existing supplier performance reporting systems also typically report the percentage of orders that are returned. However, existing systems simply report "reject performance" as a percentage of total orders that are returned without distinguishing between whether the return was supplier caused or customer caused. In some contexts, it may be useful for users of a supplier performance reporting system to know how many returns were caused by the supplier and how many were caused the customer.

SUMMARY OF THE INVENTION

The present invention addresses some of the problems of prior supplier performance reporting systems. An aspect of a present embodiment receives and process actual purchasing data to enable reporting of on-time performance relative to a plurality of order start point/end point pairs. Customers and suppliers report on-time performance for system processing using the delivery start and end points collected in the normal course of their business operations. System users may obtain supplier on-time performance reports indicating the on-time performance of suppliers relative to the plurality of start point/end point pairs reflected in the collected data.

Another aspect of a present embodiment collects transaction information predictive of whether an order reject was supplier caused or customer caused. The predicted cause of order rejects is reflected in supplier reject performance as reported by a system implementing this aspect of the present invention.

BRIEF DESCRIPTION OF THE DRAWINGS

The novel features of the invention are set forth in the appended claims. However, for purpose of explanation, several aspects of an embodiment of the invention are described by reference to the following figures.

FIG. 2a is a table illustrative of Basic Purchase Order Data provided by a customer/buyer computer system.

FIG. 2b is a table illustrative of Summarized Purchase Order Data stored in system 10 of FIG. 1.

FIG. 4 is a sample supplier performance report that may be generated by the system of FIG. 1.

FIG. 7 is a flow diagram illustrating the use of transaction data to predict whether an order reject is supplier caused or customer caused.

DETAILED DESCRIPTION OF THE DRAWINGS

In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

Figure 1:
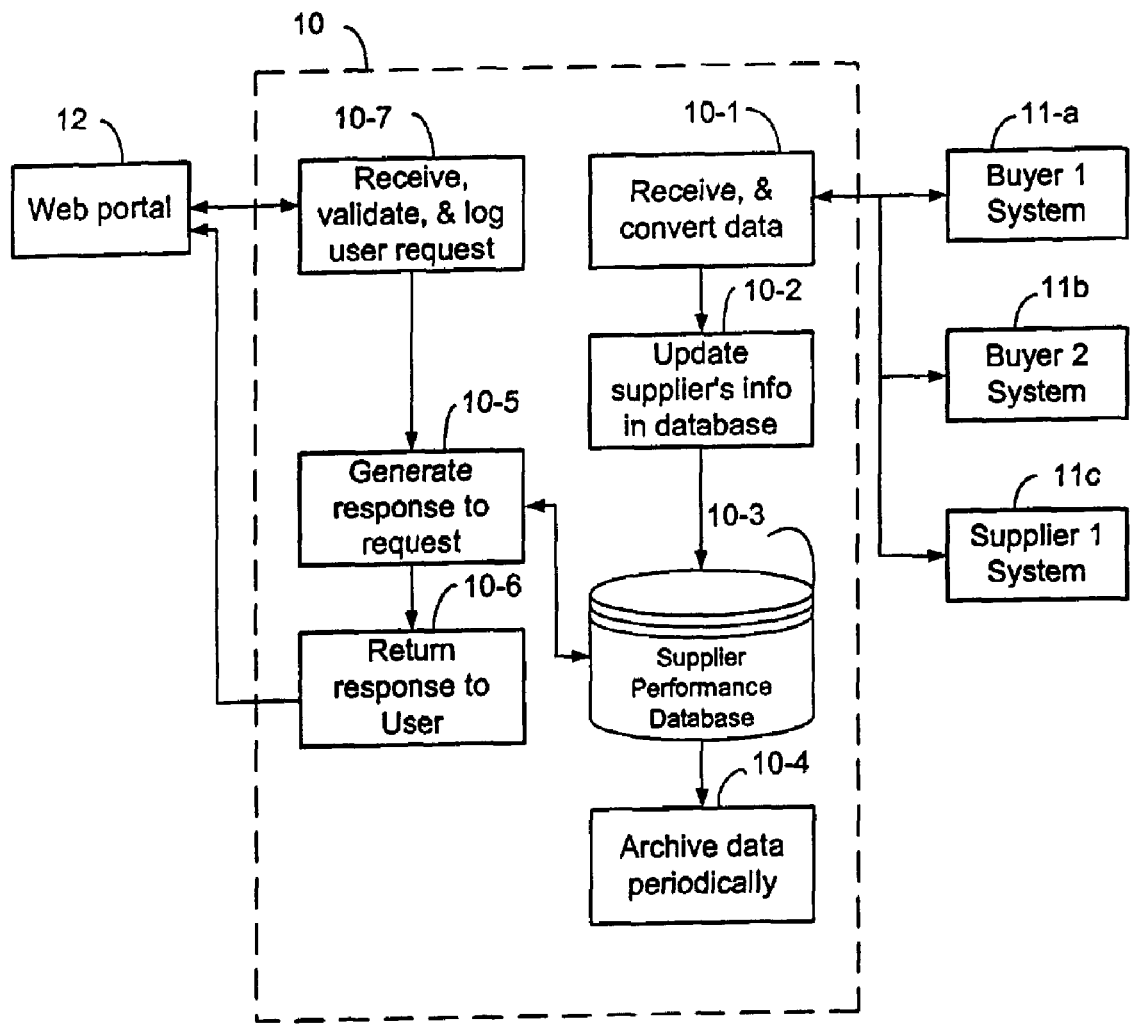
FIG. 1 is a system level view of the basic components and data flow in a system that may be used to implement an embodiment of the present invention.

FIG. 1 shows a system 10 that may be used to implement the present invention. System 10 comprises one or more computers. System 10 includes at least one processing element and at least one memory storage element. The one or more computers of system 10 will have access to executable instruction code in an electronically readable medium (code and medium not separately shown). The electronically readable medium may be any medium that either stores or carries electronic signals (including signals referred to as electrical signals and signals referred to as electromagnetic signals). The executable instruction code in an electronically readable medium directs the illustrated one or more computers to carry out various tasks described herein. The executable code for directing the carrying out of tasks described herein would be typically realized in software. However, it will be appreciated by those skilled in the art, that some computers might utilize code realized in hardware to perform many of the identified tasks without departing from the present invention.

System 10 is communicatively connected (either periodically or continuously) to computer systems at various subscribers including buyers and/or suppliers including systems 11a, 11b, and 11c. System 10 is also be communicatively connected to web portal 12. Web portal 12 is a computer or group of computers that makes information from system 10 available over the Internet to one or more subscribers. Although FIG. 1 illustrates a system that makes supplier performance information available to subscribers over the Internet, supplier performance reports may be generated by system 10 and provided to subscribers through other delivery mechanisms, such as, for example, by fax.

Blocks 10-1 to 10-7 and associated arrows indicate the processing and data flow of system 10. At block 10-1, data is received relevant to either basic purchase order data or summarized purchase order data (see FIGS. 2a, 2b, and 3 and accompanying text) from systems 11a, 11b, and 11c. This basic or summarized data may be received through a periodic batch update process or through a persistent connection that provides real time updating of system 10's stored data. Summarized purchase order data is derived from basic purchase order data using process 30 as illustrated and described in FIG. 3 and accompanying text. That process may be performed either on subscriber system 11a, 11b, and 11c or at system 10. If process 30 is performed on a subscriber system, system 10 will receive summarized purchase order data, if process 30 is performed at block 10-1 of system 10, then system 10 will receive basic purchase order data. Received data, whether summarized or basic, is converted at block 10-1 for storing in the common data base stored at block 10-3. Aside from converting any basic data received to summarized data, system 10 also transforms data using known techniques to ensure data integrity. Those skilled in the art will recognize that, for example, values relevant to primary keys (i.e. fields whose data uniquely identifies each row) may need to be added to the received data to ensure that new data added to stored data is uniquely identified in the data base (e.g., if incoming summarized data has a field for "record number" and record number values in received data repeat pre-existing values in a record number field of a stored table, and if "record number" is a primary key whose values are used to uniquely identify a row, the system will replace received record number values with unique values for adding the data to the pre-existing stored database). These and other well known techniques may be performed by system 10, but are not necessarily described in detail herein so as not to obscure the description of the embodiments with unnecessary detail.

A subscriber may transmit requests to system 10 through web-portal 12. Requests are received at block 10-7. At block 10-5, a response to the user request is generated. This generation of a response involves requesting and retrieving information from data storage block 10-3 as indicated by the arrows between blocks 10-5 and 10-3, and involves performing the processing necessary to generate a suitable data view for display. At block 10-6, the response is returned to the used through web-portal 12.

FIG. 2a shows Basic Purchase Order Data ("Basic Data") 20, exemplary of basic purchase order data that may exist on the system of the system of a buyer "GoodCo, Inc." Basic Data 20 includes records 20R-1 to 20R-5 (values 1–5 in the field labeled "Record No.) and fields 20F-1 to 20F-15 (note 20F-1 is labeled "Supplier Name", 20F-15 is labeled "Buyer Name", and the intervening fields are labeled as indicated, e.g., "Start Point" field 20F-2, "End Point" field 20F-3, etc.).

FIG. 2b shows Summarized Purchase Order Data ("Summary Data") 25 derived from Basic Data 20. Summary Data 25 includes records 25R-1, 25R-2, and 25-R3 (values 1–3 in the field labeled "Record No.") and the following fields: "Record No." field 25F-1, "Supplier Name" field 25F-2, "Start Point" field 25F-3, "End Point" field 25F-4, "# of POs" (purchase orders) Field 25F-5, "# of Line Items" field 25F-6, "Orders On-Time" field 25F-7, "Line Items On-Time" field 25f-8, and "Buyer Name" field 25F-9.

FIGS. 2a and 2b show respective Basic and Summarized data in a single table, i.e. in a flat file format. It will be appreciated by those skilled in the art, that data may be stored in other formats such as, for example, a relational data base. Thus, Basic Data 20 may be stored in multiple tables as may Summarized Data 25. For example, alternative embodiments may store summarized data for each supplier in a separate table. Also, variations on the choice of fields will be apparent to those skilled in the art. To cite but one example, the Start Point field may be combined with the End Point field into a single start point/end point pair field without any loss in relevant information. These and other variations will be apparent to those skilled in the art and it will be understood that such variations do not depart from the spirit and scope of the present invention.

Figure 3:
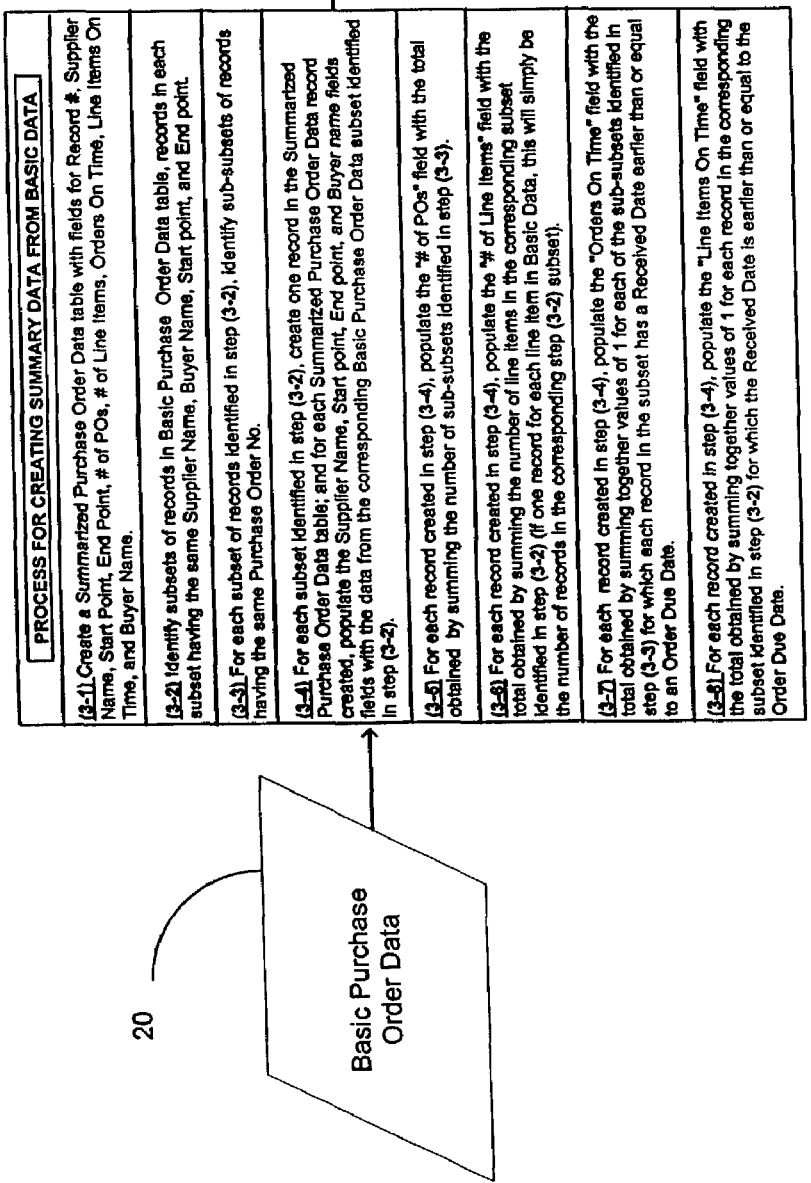
FIG. 3 is a process diagram illustrating steps for converting the Basic Purchase Order Data of FIG. 2a into the Summarized Purchase Order Data of FIG. 2b.

FIG. 3 shows an exemplary process that may be used to derive the Summary Data 25 from the Basic Data 20 of FIG. 2. Process 30 has steps 3-1 through 3-8. In step 3-1, a Summarized Data table is created with the indicated fields. In step 3-2, subsets of data are identified in Basic Data, each record in a subset having the same supplier name, buyer name, start point, and end point. Each subset of Basic Data 20 records identified in step 3-2 corresponds to a single record in Summary Data 25 as indicated in step 3-4. Also in step 3-4, for each Summary Data record created, the Supplier Name, Start Point, End Point, and Buyer name fields are populated with the data from the corresponding subset identified in step 3-2. For example, record 25R-1 (record number "1") in Summary Data 25 corresponds to the subset of records 20R-1, 20R-2, and 20R-3 (record numbers "1", "2", and "3") in Basic Data 20 since those Basic Data records have the same Supplier Name, Start Point, End Point, and Buyer Name, i.e. "Jane Doe Co.", "OC", "CFD", and "GoodCo, Inc.". Therefore, the Supplier Name, Start Point, End Point, and Buyer Name fields of Summary Data 25's record 25R-1 are populated with the respective values: "Jane Doe Co.", "OC", "CFD", and "GoodCo, Inc."

In step 3—3, sub-subsets of Basic Data 20 records are identified from the subsets identified in step 3-2. In other words, in step 3—3 subsets are identified within each subset identified in step 3-2. The sub-subsets of step 3—3 each share the same purchase order number. Note that Basic Data 20 can have multiple records for a single purchase order (e.g. records 1 and 2 in Basic Data 20).

In step 3-5, the "# of POs" field in Summary Data 25 is populated by, for each subset identified in step 3-2, adding up the number sub-subsets identified in step 3—3, and putting the total in the record of Summary Data 25 that corresponds to the step 3-2 subset of Basic Data 20 whose step 3—3 sub-subsets were totaled. For example, Records 20R-1, 20R-2, and 20R-3 of Basic Data 20 is a subset identified in step 3-2 and thus corresponds to a record in Summary Data 25 (record 25R-1). That subset in turn has two subsets (or "sub-subsets"): (20R1, 20R2 corresponding to one purchase order number) and (20R-3 corresponding to another purchase order number). Therefore, the # of POs in record 25R-1 is 2. Of course, this step could also be phrased in terms of identifying the number of unique purchase order numbers in each subset of records identified in step 3-2.

In step 3-6, the "# of line items" field in Summary Data 25 is populated by adding up the number of line unique line items in each corresponding subset identified in step 3-2. Note that since Basic Data 20 has one record for each line item number, the results of step 3-6 in this instance will simply be the number of records in each subset identified in step 3-2 (note the number "2" in the "Line Item Number" field of record 20R-2 of Basic Data 20 is an identification number, not a number of line items in that record; each record in Basic Data 20 contains a single line item). In step 3-7, the "Orders On Time" field in Summary Data 25 is populated by adding up the total number of sub-subsets identified in step 3—3 for which every record in the sub-subset has a "Received Date" value that is earlier that its "Due Date" value. In other words, an order is defined as on time if every line item in the order was delivered on time. In step 3-8, the "Line Items On Time" field in Summary Data 25 is populated by, for each corresponding step 3-2 subset, summing together all the records in which the "Received Date" is equal to or earlier than the "Due Date."

Those skilled in the art will recognize that process 30 represents just one example of a series of steps that might be used to convert Basic Data 20 to Summary Data 25. Also, those skilled in the art will recognized that first executable code used to carry out a first step in process 30 might be the same code as second executable code used to carry out a second step in process 30. For example, a single piece of executable code might direct a computer to, for each record in Summary Data 25, store in the "# of POs" field 25F-5, the value obtained by counting the records in Basic Data 20 that have the same the same supplier name, start point, end point, and buyer name as the corresponding Summary Data 25 record and that also have identical purchase order numbers. Such a piece of code would be performing step 3-5 of process 30, but would also implicitly be performing step 3—3 and 3-2. Thus, such a piece of code could be said to be first code for performing step 3-2, second code for performing step 3—3, and third code for performing step 3-5. Those skilled in the art will recognize therefore that executable code may be organized in a variety of ways without departing from the spirit and scope of the present invention.

Furthermore, while process 30 works to convert Basic Data 20 into Summary Data 25, customer/buyers and suppliers might have basic purchase order data that is organized differently from the example of Basic Data 20. In such instances, those skilled in the art will recognize that executable code may, without undue experimentation, be written that will implement processes different that process 30 in order to convert basic data that is organized differently than Basic Data 20 into summary data similar to Summary Data 25.

It may also be noted that because the "Order Status" values in field 20F-10 of Basic Data 20 are "Closed" for each record, other data (e.g. received date) is available for each record. However, process 30 can be easily modified to handle the addition of data that includes some records that are incomplete because the "Order Status" value is "Open". As one example, process 30 might be modified to operate only on records whose status is "Closed." As one other example, process 30 might be modified to leave blank place holders in Summary Data 25 for records that cannot currently be completed (e.g., if all of the records in a subset identified in step 3-2 are "open", a place holder such as "--" might be inserted into Summary Data 25 fields that cannot be properly completed for the corresponding record in Summary Data 25, and then those records may be ignored or at least partially ignored when creating reports from Summary Data 25). In this manner, basic purchase order data such as Basic Data 25 may be processed without having to first remove records for unclosed orders.

FIG. 4 shows sample on-time performance report 40 that may be generated by the system of FIG. 1. Report 40 includes tables 40a and 40b and reports on-time performance for a domestic supplier S1 during a reporting period. Display table 40a reports supplier S1's on time performance across all customer buyers providing data to for the system. Table 40a displays data for on time performance with respect to a plurality of start point/end point pairs. Table 40a includes records 40aR-1, 40aR-2, 40aR-3, and 40aR-4, corresponding, respectively, to the following start point/end point pairs in field 40aF-1: OS-CFD ("order sent"-"customer final destination"), OC-SSD ("order confirmed"-"supplier shipping dock"), OC-DTO ("order confirmed"-"destination transport onboard"), OC-CFD ("order confirmed"-"customer final destination"). In addition to start point/end point field 40aF-1, table 40a also includes field 40aF-2 ("No. of orders"), field 40aF-3 ("% on time"), field 40aF-4 ("No. of line items"), and field 40aF-5 ("% on time").

Display table 40b reports on time performance for orders placed with supplier S1 by customer/buyer C1. Table 40b displays data for on time performance with respect to a plurality of start point/end point pairs. Table 40b includes records 40bR-1, 40bR-2, 40bR-3, and 40bR-4, corresponding to, respectively, the following indicated start point/end point pairs in field 40bF-1. In addition to start point/end point field 40bR-1, table 40b also includes field 40bF-2 ("No. of orders"), field 40bF-3 ("% on time"), field 40bF-4 ("No. of line items"), and field 40bF-5 ("% on time").

Figure 5:
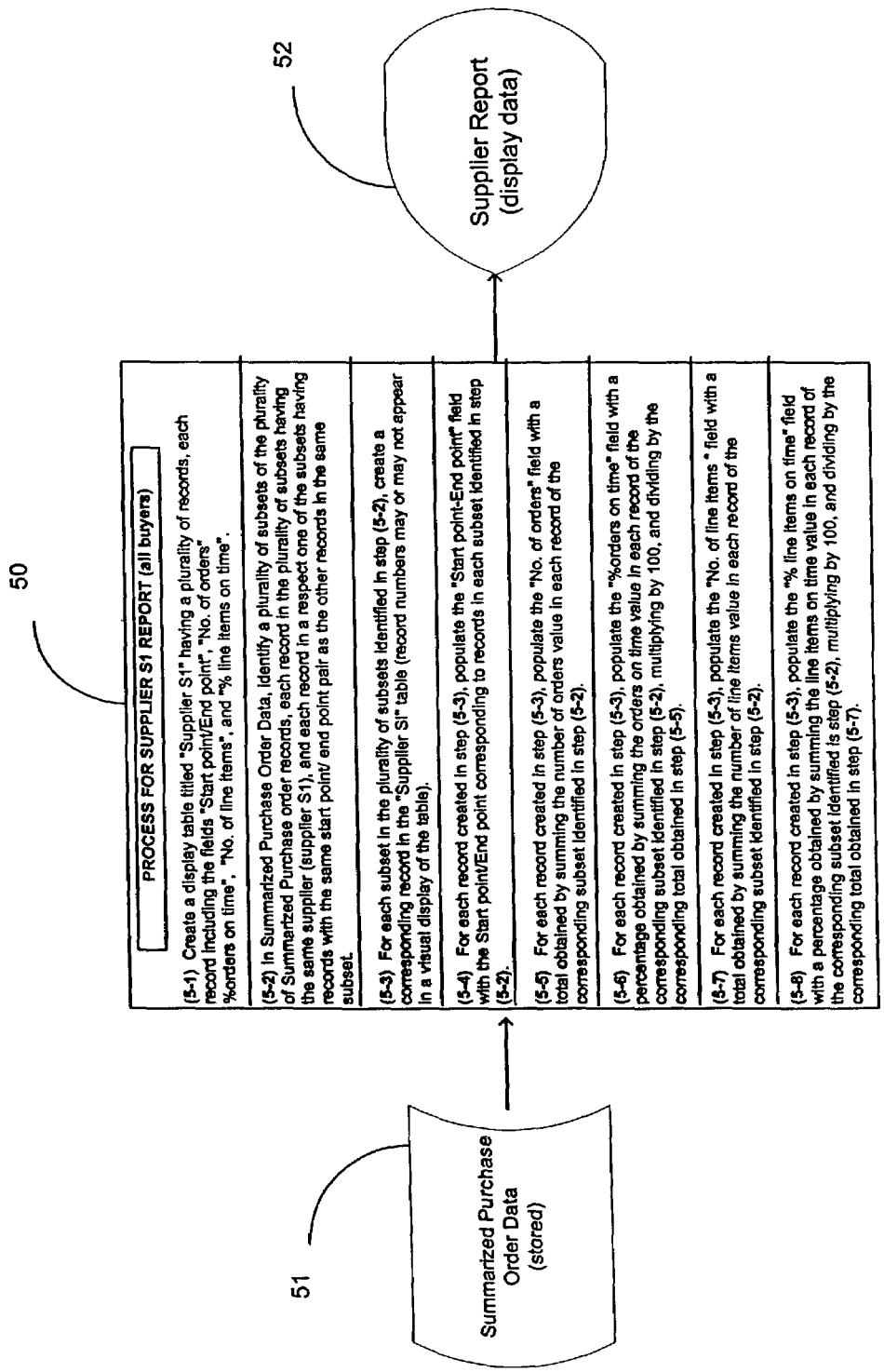
FIG. 5 is a process diagram illustrating steps for creating a supplier performance report from Summarized Purchase Order Data.

FIG. 5 shows an exemplary process 50 that may be used to derive displayed Supplier Report 52 from Summarized Purchase Order Data ("Summary Data") 51. Supplier Report 52 is analogous to display table 40a in FIG. 4, in that Supplier Report 52 is indicative of on time performance for a supplier S1 based on data from all supplier S1 customers providing data to the system. Summary Data 51 is analogous to Summary Data 25 of FIG. 2b. Process 50 has steps 5-1 through 5-8. In step 5-1, an empty Supplier Report table 52 is created with the indicated fields. In step 5-2, subsets of data are identified in Summary Data 51, each record in a subset having the same supplier name, start point, and end point. Each subset of Summary Data 51 records identified in step 5-2 corresponds to a single record in Supplier Report 52 as indicated in step 5-3. In step 5-4, for each Supplier Report 52 record created in step 5-3, the "Start point/End point" field of Supplier Report 52 is populated with the start points and end points from the corresponding subset of Summary Data 51 records identified in step 5-2 (note, steps 5-3 and 5-4 are roughly analogous to the single step 3-2 illustrated and described in FIG. 3 and accompanying text). In step 5—5 the "No. of POs" field in Supplier Report 52 is populated by adding up the values of the number of orders in each subset of Summary Data 51 records identified in step 5-2, and putting the respective totals in the corresponding record of Supplier Report 52. In step 5-6, the "% orders on time" field of Supplier Report 52 is populated for each Supplier Report 52 record with percentages obtained by summing the orders on time values of Summary Data 51 records in the corresponding subsets identified in step 5-2, multiplying each by 100, and dividing each by the corresponding total obtained in step 5—5. In step 5-7, the "# of line items" field in Supplier Report 52 is populated by summing the number of line items value in each record of the corresponding subset identified in step 5-2. In step 5-8, the "% line items on time" field of Supplier Report 52 is populated for each Supplier Report 52 record with percentages obtained by summing the line items on time values of Summary Data 51 records in the corresponding subsets identified in step 5-2, multiplying each by 100, and dividing each by the corresponding totals obtained in step 5-7. Those skilled in the art will recognize that the number of line items or orders delivered on time may readily be reported as a percentage number, an absolute number, or both. Use of a percentage in a display report is desirable for facilitating subscribers to quickly compare on-time performance across several suppliers.

Those skilled in the art will recognize that process 50 represents just one example of a series of steps that might be used to convert Summary Data 51 into Supplier Report 52. Also, those skilled in the art will recognized that first executable code used to carry out a first step in process 50, might be the same code as second executable code used to carry out a second step in process 50.

Although process 50 shows steps for creating display data from summary data with respect to a particular supplier across all customer orders (i.e. display data analogous to table 40a of FIG. 4), it does not show steps for creating display data from summary data with respect to a particular supplier across the orders of only one customer (i.e., display data analogous to table 40b of FIG. 4). The reason is that the display data for orders with respect to a single customer is already contained in a summary data table such as Summary Data 25 of FIG. 2. To create a display table such as table 40b from summary data such as Summary Data 25, it will be understood that one need only pull up those records sharing the same supplier name and buyer name, and display the on time results for each start point/end point pair. The only calculation needed is that of converting an number or orders or line items on time into a percentage. Therefore, such a process is not separately illustrated.

Although the examples disclosed in FIGS. 2–5 show conversion of basic data into summary data which is stored and used to generate supplier reports, it will be recognized by those skilled in the art that it is possible to only store data that is in a format that is close to the format of Basic Data 20 and still generate reports similar to report 40 of FIG. 4 without the intermediate step of creating and storing summary data such as Summary Data 25. For example, basic purchase order data such as Basic Data 20 might be received and modified only by adding new record numbers to enforce uniqueness for adding to a common data base. Then a process would be written to derive reports such as report 40 directly from basic data such as Basic Data 20. Although such an approach would not necessarily depart from the scope of the present invention, for operating a system such as system 10 on a large scale it is preferable for performance reasons to derive reports from a data base of summary data. Less storage space is needed and less processing time is needed to create display data from summary data than would be needed to create display data from basic order data.

Figure 6:
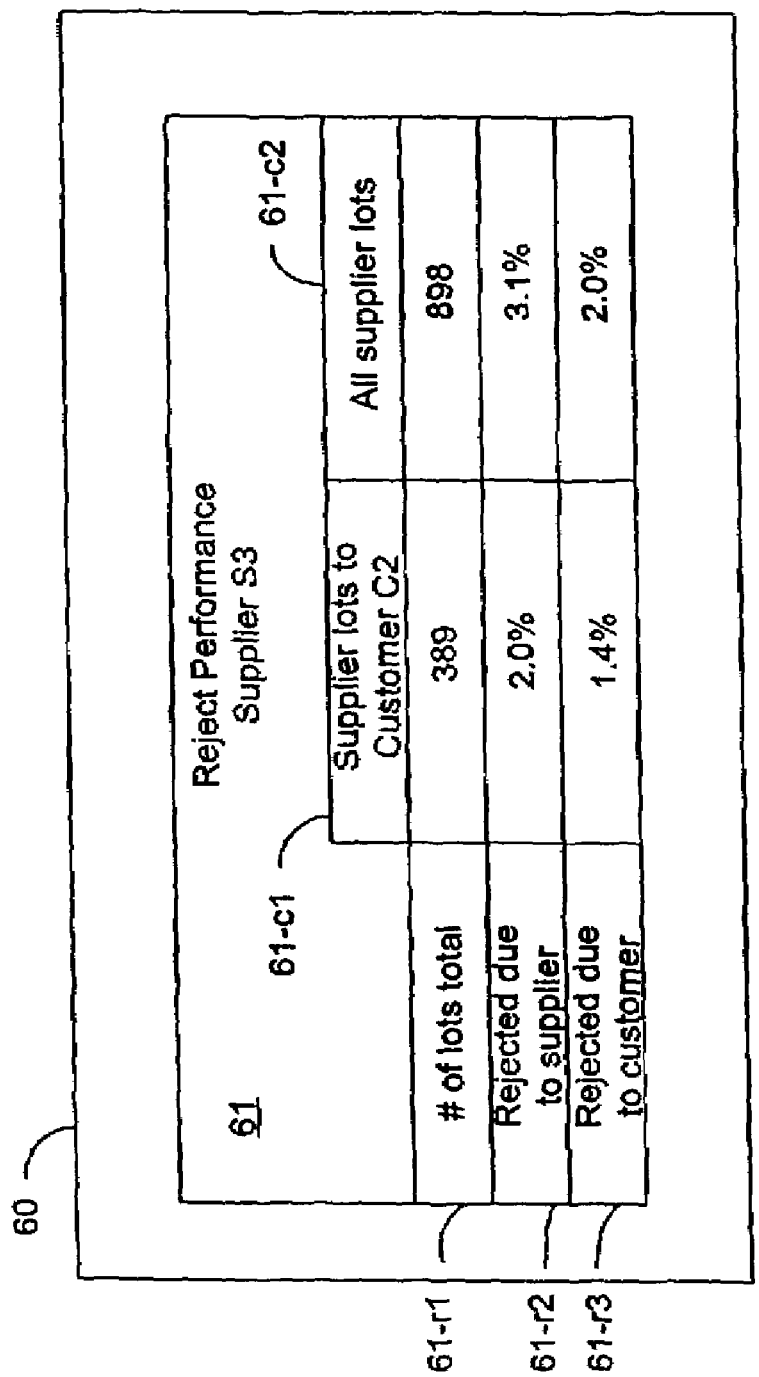
FIG. 6 is a sample reject performance report that may be generated by the system of FIG. 1.

FIG. 6 shows a sample reject report 60 that may be generated by the system of FIG. 1 using the decision flow illustrated in FIG. 7 and accompanying text. Report 60 includes table 61 and reports reject performance for a domestic supplier S3 during a reporting period. Column 61-c1 shows reject performance information for items in orders placed with supplier S3 by customer C2. Column 61-c2 shows reject performance items in orders placed by all customers to supplier S3. Row 61-r1 shows total lots in orders placed (at the intersection of row 61-r1 and column 61-c1, this reflects total lots in orders placed by customer C2 to supplier S3, and at the intersection for row 61-r2 and column 61-c2 this reflects total lots in orders placed by customer C2). Row 61-r2 shows the percentage of lots in row 61-r1 that are rejected due to the supplier. Row 61-r3 shows-the percentage of lots in row 61-r1 that are rejected to the to customer.

FIG. 7 is a flow diagram illustrating predictive data elements and the predictions made by the system of FIG. 1 about the cause of rejects based on those predictive data elements in a system implementing an aspect of the present invention. The decision flow illustrated in FIG. 7 may be used to obtain a reject report such as reject report 60 of FIG. 6. Customers and suppliers generally gather data that can be used in making a prediction about whether a reject was supplier caused or customer caused. Blocks 71a and 72–76 in FIG. 7 reflect predictive data elements that can be used by a supplier performance reporting system to make a prediction and report a reject as either supplier caused or customer caused.

Beginning at the top of the flow diagram, if the item was not returned, the result of block 71 is "no." If the item was not returned, but payment was less than the invoice, the system indicates that the order has, in a sense, been "rejected" in that the customer refused to pay the full amount. In such a case, the result of block 71a is "yes" and, as reflected by the arrow from block 71a to block 78, the system predicts and reports this rejection as supplier caused. If the payment was not less than the invoice and the item was not returned, than the result of block 71a is "no" and the system reports the order as not rejected as indicated by the arrow from block 71a to block 71b.

If the order was returned, then the result of block 71 is "yes" as reflected by the arrow from block 71 to block 72. If the order was cancelled, the result of block 72 is "yes" and the reject is predicted and reported to be customer caused as indicated by the yes arrow from block 72 to block 77. If the answer is no, then, as illustrated by the arrow from block 72 to block 73, the system next considers whether or not the same item that was ordered was reshipped after the return. If the item was reshipped, then the result of block 73 is "yes" and the reject is predicted and reported to be supplier caused as indicated by the arrow from block 73 to block 78. If the result of block 73 is "no", then, as illustrated by the arrow from block 73 to block 74, the system next considers whether or not the delivery was late. If the delivery was late, the result of block 74 is "yes" and, as indicated by the arrow from block 74 to block 78, the reject is predicted and reported to be supplier caused. If the result of block 74 is "no", then, as illustrated by the arrow from block 74 to block 75, the system next considers whether or not there was a purchase order ("PO")/invoice mismatch. If there was a PO/Invoice mismatch, then the result of block 75 is "yes" and, as indicated by the arrow from block 75 to block 78, the reject is predicted and reported as supplier caused. If the result of block 75 is "no", then, as illustrated by the arrow from block 75 to block 76, the system next considers whether or not an item shipped was defective. If an item shipped was defective, then the result of block 76 is "yes" and, as indicated by the arrow from block 76 to block 78, and the return is predicted and reported as supplier caused. If, however, the item shipped was not defective, then the result of block 76 is "no" and, as indicated by the arrow from block 76 to block 77, the return is predicted and reported as customer caused.

The order of blocks 72–76 may be varied. Note that if, for example, block 76 were not the last block, its "No" arrow would simply point to the next block rather than to block 77. If information is not available from either the supplier or customer to make a determination for one or more of the blocks 72–76, a "No" answer is delivered for those blocks with insufficient information and the remaining blocks are used to make a reject determination.

Executable code may instruct one or more computers to perform the processing steps illustrated in FIG. 7. Those skilled in the art, many variations on executable code may be found that do not depart from the spirit and the scope of the present invention, but that, nevertheless, use predictive data elements to create reports analogous to the report illustrated in FIG. 6, thereby allowing subscribers to evaluate reject performance in light of whether the rejects were supplier caused or customer caused.

Although particular embodiments have been described in detail, various modifications to the embodiments described herein may be made without departing from the spirit and scope of the present invention, thus, the invention is limited only by the appended claims.

I claim:

1. A method for reporting supplier on time performance comprising:
   storing in a database summarized purchase order data from a plurality of buyers, the summarized purchase order data comprising a plurality of records, each record in the plurality of records including a supplier, a buyer, a one of a plurality of start point/end point pairs for measuring on time delivery, a number of orders placed, and a number of orders delivered on time, wherein the start point is representative of a plurality of events triggering a start of a time period used to measure delivery time, the end point is representative of a plurality of events triggering an end of a time period used to measure delivery time, and each of the plurality of start point/end point pairs can be different from each other for at least one buyer, and wherein the start point corresponds to a first point along an order fulfillment process and the end point corresponds to a second point along the order fulfillment process;
   for a first subset of the plurality of records, each record in the first subset including a first of the plurality of start point/end point pairs and a first supplier, summing together the number of orders placed included in each record of the first subset to obtain a first total number of orders placed with the first supplier for which the first start point/end point pair is used to measure on time delivery;
   for the first subset of the plurality of records, summing together the number of orders delivered on time to obtain a number of the first total number of orders that were delivered on time;
   for a second subset of the plurality of records, each record of the second subset including a second of the plurality of start point/end point pairs and the first supplier, summing together the number of orders placed included in each record of the second subset to obtain a second total number of orders placed with the first supplier for which the second start point/end point pair is used to measure on time deliver;
   for the second subset of the plurality of records, summing together the number of orders delivered on time to obtain a number of the second total number of orders that were delivered on time;
   for a third subset of the plurality of records, each record in the third subset including a third of the plurality of start point/end point pairs and a second supplier, summing together the number of orders placed included in each record of the third subset to obtain a third total number of orders, the third total number of orders placed with the second supplier for which the first start point/end point pair is used to measure on time delivery;
   for the third subset of the plurality of records, summing together the number of orders delivered on time included in each record of the third subset to obtain a number of the third total number of orders that were delivered on time; and
   reporting the plurality of buyers and the plurality of suppliers the first total number of orders, the number of the first total number of orders that were delivered on time, the second total number of orders, the number of the second total number of orders that were delivered on time, the third total number of orders and the number of the third total number of orders that were delivered on time.

2. The method of claim 1 wherein the number of the first total number of orders that were delivered on time is a percentage and the number of the second total number of orders that were delivered on time is a percentage, the method further comprising:
   dividing the number of the first total number of orders that were delivered on time by the first total number of orders and multiplying the result by 100; and
   dividing the number of the second total number of orders that were delivered on time by the second total number of orders and multiplying the result by 100.

3. The method of claim 1 wherein the number of the first total number of orders that were delivered on time is a percentage, the number of the second total number of orders that were delivered on time is a percentage, and the number of the third total number of orders that were delivered on time is a percentage, the method further comprising:
   dividing the number of the first total number of orders that were delivered on time by the first total number of orders and multiplying the result by 100;
   dividing the number of the second total number of orders that were delivered on time by the second total number of orders and multiplying the result by 100; and
   dividing the number of the third total number of line items that were delivered on time by the third total number of line items and multiplying the result by 100.

4. The method of claim 1 wherein the third subset of the plurality of records consists of a single record.

5. The method of claim 1 wherein each of the plurality of records in the summarized purchase order data also includes a number of line items and a number of line items delivered on time, the method further comprising:
   for the first subset of the plurality of records, summing together the number of line items included in each record of the first subset to obtain a first total number of line items ordered from the first supplier for which the first start point/end point pair is used to measure on time delivery;
   for the first subset of the plurality of records, summing together the number of line items delivered on time to obtain a number of the first total number of line items that were delivered on time; and reporting to the plurality of buyers the first total number of line items and the number of the first total number of line items that were delivered on time.

6. The method of claim 5 wherein the number of the first total number of orders that were delivered on time is a percentage, the number of the second total number of orders that were delivered on time is a percentage, and the number of the first total number of line items that were delivered on time is a percentage, the method further comprising:

dividing the number of the first total number of orders that were delivered on time by the first total number of orders and multiplying the result by 100;

dividing the number of the second total number of orders that were delivered on time by the second total number of orders and multiplying the result by 100; and dividing the number of the first total number of line items that were delivered on time by the first total number of line items and multiplying the result by 100.

7. A system for reporting supplier on time performance comprising:

at least one computer;

first executable code for storing in a database summarized purchase order data from a plurality of buyers, the summarized purchase order data comprising a plurality of records, each record including a supplier, a buyer, a one of a plurality of start point/end point pairs for measuring on time delivery, a number of orders placed, and a number of orders delivered on time, wherein the start point is representative of a plurality of events triggering a start of time period used to measure delivery time, the end point is representative of a plurality of events triggering a end of time period used to measure delivery time, and each of the plurality of start point/end point pairs can be different from each other for at least one buyer, and wherein the start point correspond to a first point along an order fulfillment process and the end point corresponds to a second point along the order fulfillment process;

second executable code for, with respect to a first subset of the plurality of records, each record in the first subset including a first of the plurality of start point/end point pairs and a first supplier, summing together the number of orders placed included in each record of the first subset to obtain a first total number of orders placed with the first supplier for which the first start point/end point pair is used to measure on time delivery;

third executable code for, with respect to the first subset of the plurality of records, summing together the number of orders delivered on time to obtain a number of the first total number of orders that were delivered on time;

fourth executable code for, with respect to a second subset of the plurality of records, each record of the second subset including a second of the plurality of start point/end point pairs and the first supplier, summing together the number of orders placed included in each record of the second subset to obtain a second total number of orders placed with the first supplier for which the second start point/end point pair is used to measure on time deliver;

fifth executable code for, with respect to the second subset of the plurality of records, summing together the number of orders delivered on time to obtain a number of the second total number of orders that were delivered on time;

sixth executable code for assembling a report, the report including the first total number of orders, the number of the first total number of orders that were delivered on time, the second total number of orders, and the number of the second total number of orders that were delivered on time;

wherein the first, second, third, fourth, fifth and sixth executable code is in an electronically readable medium accessible to the at least one computer;

seventh executable code for, with respect to a third subset of the plurality of records, each record in the third subset including a third of the plurality of start point/end point pairs and a second supplier, summing together the number of orders placed included in each record of the third subset to obtain a third total number of orders, the third total being a total number of orders placed with the second supplier for which the first start point/end point pair is used to measure on time delivery; and eighth executable code for, with respect to the third subset of the plurality of records, summing together the number of line orders delivered on time to obtain a number of the first total number of orders that were delivered on time;

wherein the report assembled by the sixth executable code also includes the third total number of orders and the number of the third total number of orders that were delivered on time; and wherein the seventh and eighth executable code is also in an electronically readable medium accessible to the at least one computer.

8. The system of claim 7, wherein the number of the first total number of orders that were delivered on time is a percentage and the number of the second total number of orders that were delivered on time is a percentage, the system further comprising:

ninth executable code for dividing the number of first total number of orders delivered on time by the second total number of orders and multiplying the result by 100; and tenth executable code for dividing the number of the second total number of orders that were delivered on time by the second total number of orders and multiplying the result by 100 wherein the ninth and tenth executable code is also in an electronically readable medium accessible to the at least one computer.

9. The system of claim 7 wherein the number of the first total number of orders that were delivered on time is a percentage, the number of second total number of orders that were delivered on time is a percentage, and the number of the third total number of orders that were delivered on time is a percentage, the system further comprising:

ninth executable code for dividing the number of first total number of orders delivered on time by the first total number of orders and multiplying the result by 100; and tenth executable code for dividing the number of the second total number of orders that were delivered on time by the second total number of orders and multiplying the result by 100; and eleventh executable code for dividing the number of the third total number of orders that were delivered on time by the third total number of orders and multiplying the result by 100;

wherein the ninth, tenth and eleventh executable code is also in an electronically readable medium accessible to the at least one computer.

10. The system of claim 7 wherein each of the plurality of records in the summarized purchase order data also includes a number of line items and a number of line items delivered on time, the system further comprising:

seventh executable code for, with respect to the first subset of the plurality of records, summing together the number of line items included in each record of the first subset to obtain a first total number of line items ordered from the first supplier for which the first start point/end point pair is used to measure on time delivery; and eighth executable code for, with respect to the first subset of the plurality of records, summing together the number of line items delivered on time to obtain a number of the first total number of line items delivered on time;

wherein the report assembled by the sixth executable code also includes the first total number of line items and the number of the first total number of line items that were delivered on time; and wherein the seventh and eighth executable code is also in an electronically readable medium accessible to the at least one computer.

* * * * *